United States Patent
Franz et al.

(10) Patent No.: US 7,411,938 B2
(45) Date of Patent: Aug. 12, 2008

(54) SPLITTING UP THE HANDLING OF VOICE CHANNEL-RELATED FUNCTIONS IN A TELECOMMUNICATIONS NETWORK, WHEREBY ONLY THE LEAST USED FUNCTIONS ARE CENTRALLY PROVIDED

(75) Inventors: Mathias Franz, Berlin (DE); Alfred Jugel, Geretsried (DE); Patrick Kleiner, München (DE); Norbert Löbig, Darmstadt (DE); Klaus Pulverer, München (DE)

(73) Assignee: Siemens Aktiengesellschaft, Munich (DE)

( * ) Notice: Subject to any disclaimer, the term of this patent is extended or adjusted under 35 U.S.C. 154(b) by 979 days.

(21) Appl. No.: 10/764,291

(22) Filed: Jan. 23, 2004

(65) Prior Publication Data
US 2004/0151299 A1   Aug. 5, 2004

(30) Foreign Application Priority Data
Jul. 25, 2001  (DE)  ................................ 101 36 225
Jul. 22, 2002  (DE)  ..................... PCT/DE02/02688

(51) Int. Cl.
*H04L 12/66*  (2006.01)

(52) U.S. Cl. ..................................... 370/352; 379/88.14
(58) Field of Classification Search .............. 379/88.17, 379/88.14; 370/352, 230, 353, 354, 356
See application file for complete search history.

(56) References Cited

U.S. PATENT DOCUMENTS

| | | | |
|---|---|---|---|
| 5,878,117 A | 3/1999 | Minakami et al. | |
| 6,597,686 B1 * | 7/2003 | Smyk | 370/352 |
| 6,600,736 B1 * | 7/2003 | Ball et al. | 370/352 |
| 6,671,367 B1 * | 12/2003 | Graf et al. | 379/229 |

FOREIGN PATENT DOCUMENTS

| | | |
|---|---|---|
| EP | 0 637 160 A2 | 1/1995 |
| WO | WO 00/10316 | 2/2000 |
| WO | WO 01/49011 A1 | 7/2001 |

\* cited by examiner

*Primary Examiner*—Creighton H Smith
(74) *Attorney, Agent, or Firm*—Bell, Boyd & Lloyd LLP

(57) ABSTRACT

The invention relates to a method for providing voice channel-related functions in a telecommunications network, whereby first voice channel functions are centrally provided, and second voice channel functions are decentrally provided. The invention also relates to a telecommunications network for implementing this method.

16 Claims, 4 Drawing Sheets

SPLITTING UP THE HANDLING OF VOICE CHANNEL-RELATED FUNCTIONS IN A TELECOMMUNICATIONS NETWORK, WHEREBY ONLY THE LEAST USED FUNCTIONS ARE CENTRALLY PROVIDED

CROSS REFERENCE TO RELATED APPLICATIONS

This application is the a continuation of International Application No. PCT/DE02/02688, filed Jul. 22, 2002 and claims the benefit thereof. The International Application claims the benefits of German application No. 10136225.0 filed Jul. 25, 2001, both of the applications are incorporated by reference herein in their entirety.

FIELD OF INVENTION

The present invention relates to a method for providing voice channel-related functions in a telecommunications network and to a telecommunications network for implementing said method.

BACKGROUND OF INVENTION

As shown in FIG. 1, a switching node generally consists of peripheral units (connection equipment for subscribers or lines), a central computer platform, message distribution equipment, and other, central units such as a switching network, protocol termination equipment (for Signaling System No. 7, for example), a background memory, and operating equipment etc.

The peripheral equipment performs essential call-processing functions associated with the voice channels of the peripheral equipment. Said equipment therefore contains call-processing and administration & maintenance programs and the data information associated with the equipment such as port assignment, signaling, classes-of-service, directory numbers, individual characteristics of trunk circuits and subscriber lines, and the capacity level and configuration of the peripheral equipment.

The central computer platform coordinates and controls the connection setup and cleardown process and the responses to administrative configuration changes and to such changes due to faults.

The classical peripheral equipment terminates the trunk circuits for whose handling in call-processing terms it is responsible. The various items of peripheral equipment are linked via the message distribution system to each other and to the common computer platform. The other central system components make special functions, for example for through-connecting the voice channels, processing the signaling protocols, implementing the operator interface, or storing bulk data, available to the switching system.

For fault-tolerance reasons the central components of a switching system are of redundant design (duplicated, for example). The peripheral equipment is generally not of redundant design. It can, however, be of redundant design when fault-tolerance requirements are more stringent (maintaining stable connections when an item of peripheral equipment fails, for instance).

Limitations as regards the number of voice channels that can be terminated no longer apply when signaling and voice transmission take place in a dissociated manner on separate paths and the peripheral equipment's only function is signal processing and/or conversion with no physical termination of the voice channels. For this application, said logical peripheral equipment is determined in terms of its capacity by the power of the processors, the size of the memory, and the capacity of the message interface.

Since more than one route has to be made available for through-connecting voice between an A-subscriber or an A-side trunk (which is to say a trunk circuit to a far-end switching center) and any B-subscriber or a B-side trunk, two different items of peripheral equipment (PE) are generally involved in the connection setup and cleardown process, as is shown in FIG. 2.

The switching center responsible for controlling connections routed outside the switching center can make subscriber or network features known from classical telephone networks (such as TDM networks—TDM: Time Division Multiple Access) available to the A- and/or B-side subscriber. Said features include, in particular, announcements and dialogs which are necessary in certain situations (such as "The number you have dialed is unobtainable", "The number you have dialed has changed; the new number is 722-25940." or determining the class-of-service for dialing into a packet network).

In the classical case where the connection's useful channel is routed into the switching center, these announcements and dialogs can be provided by peripheral equipment having suitable functionality. If, however, the useful data is routed outside the switching center in a packet network, an external system is preferably employed for this. Said external system has interfaces to the packet network for the useful data consisting of announcements and user entries. The external announcement and dialog system (also: IVR system or Interactive Voice Response system) furthermore has a logical control interface to the switching center responsible in the packet network for controlling connections routed outside the switching center, as is shown in FIG. 2.

In the prior art, available IVR systems are generally TDM-based (TDM: Time Division Multiplex) and combine the entire range of functions in order to be universally applicable. This universality has the disadvantage of cost, requiring that maximum effective use be made of an IVR system. Two application scenarios are customary in TDM-based data transmission networks with conventional switching centers (the classical telephone network, for example), as described below:

On the one hand, peripheral equipment of the switching center with hardware modules for providing announcements and DTMF (Discrete Tone Multi-Frequency) signal recognition and/or voice recognition is introduced into the switching center. To play an announcement or dialog, the subscriber/trunk is switched via a 64-kbit/s through-connection to a port of the special peripheral equipment for announcements and dialogs. From the call-processing viewpoint this is a through-connection from an item of A-side peripheral equipment via the switching network to the B-side peripheral equipment with announcement and dialog functionality. The B-side announcement/dialog port acts like a B-side trunk. The type of announcement to be played or type of dialog functions is indicated by means of signaling within the switching center to the peripheral equipment with announcement and dialog functionality, or is permanently pre-defined.

The advantage of this implementation lies in the announcement and dialog functionality's being integrated in the switching center, which is very economical in terms of cost. Broad access to the hardware functionality of the peripheral equipment for announcement and dialog functionality is also facilitated.

The disadvantage of this implementation arises from the fact that if the useful channel is routed on a packet basis or outside the switching center, this functionality cannot be used or can only be used with an upstream gateway (see also FIG. 3) serving as the network interworking point between the TDM-based data transmission network (classical telephone network) and packet network (such as the internet). Furthermore, the voice data which in the prior art is presented in PCM/TDM (Pulse Code Modulation/Time Division Multiplex) technology must be converted into packet data. A load in terms of useful data for announcements and dialogs furthermore arises in the controlling switching center and there is a loss of speech quality due to conversion of the useful data from the TDM/PCM system into packet data.

On the other hand, announcements and dialogs are also made available at the network interworking point between the packet and TDM network as well, or by packet-based IVR systems specially designed for announcement and dialog functions. The announcement and dialog functions are here controlled by the switching center's call control server controlling the connection.

The advantages of this system lie in its being able to be used in packet networks without the need to provide TDM equipment for it, there being no need for additional conversion of the useful data from the TDM system into packet data. However, the disadvantage of this system arises from the fact that the switching center controlling the switching center for connections routed in the packet network cannot access the IVR functions in the packet network.

SUMMARY OF INVENTION

The object of the present invention is therefore to disclose a method and devices for providing voice channel-related functions in a telecommunications network whereby a reduction in the data load over the data transmission network is achieved with minimum implementation effort.

This object is achieved by means of a method for providing voice channel-related functions in a telecommunications network according to the attached claim 1 and by means of a telecommunications network for implementing said method according to the attached claim 8.

According to the present invention the IVR functionality is split into two areas taking account of the frequency of usage and complexity of the implementation. It is a provision of the invention for seldom required voice channel-related functions to be provided centrally by a first switching center and for frequently required voice channel-related functions to be provided non-centrally by a multiplicity of switching centers.

The method according to the invention for providing voice channel-related functions in a telecommunications network thus makes first voice channel-related functions, used less frequently, available centrally and second voice-channel functions, used more frequently, available non-centrally.

The advantage of the present invention derives from the relief it affords the telecommunications network used for transmitting the voice data, the voice-channel functions being preferably called up from an announcement device located in the vicinity of the calling subscriber.

Advantageous embodiments of the present invention are presented in the respective subclaims.

The voice channel-related functions are controlled centrally by a central control. This control can take place using known protocols based, for example, on the standards for Signaling System No. 7 (SS7), MGCP (Media Gateway Control Protocol), or H.248.

The first voice channel-related functions can be complex dialog functions such as interrogating the credit amount on a pre-paid card, voice recognition, text-to-speech functionality etc., along with the associated actions, and the second voice channel-related functions can be tones (such as dial tone, busy tone), simple dialogs, such as interrogating a PIN number, simple announcements, such as "The number you have dialed is unobtainable", or the recognition of subscriber entries in the form of DTMF (Discrete Tone Multi-Frequency) signals. The first voice channel-related functions can furthermore also include simple announcements, tones, and simple dialogs.

This means that according to the present invention only the second voice channel-related functions, which are used frequently, are made available additionally or exclusively non-centrally. The first voice channel-related functions can furthermore be transmitted over a first data transmission network and the second voice channel-related functions via a second data transmission network. The second data transmission network is advantageously a circuit-switched data transmission network, such as the public telephone network (PSTN: Public Switched Telephone Network), and the first data transmission network is advantageously a packet-switched data transmission network, such as an IP-based data transmission network (Internet Protocol such as employed for the internet) or an ATM-based data transmission network (ATM: Asynchronous Transfer Mode).

The first voice channel-related functions can be provided by means of a dialog device in a switching center for the second data transmission network and the second voice channel-related functions can be provided in a network interworking node (also referred to as a media gateway) between the first and second data transmission network.

The media gateway advantageously has the possibility of transmitting the second voice channel-related functions over the circuit-switched data transmission network and/or the packet-switched data transmission network.

BRIEF DESCRIPTION OF THE DRAWINGS

The present invention is explained in greater deal below with the aid of an exemplary embodiment with reference to the attached figures, in which

FIG. 4 shows an exemplary instance of the provisioning of voice channel-related functions according to the invention such as announcements, tones, dialogs etc. in a telecommunications network.

DETAILED DESCRIPTION OF INVENTION

Figure 1:
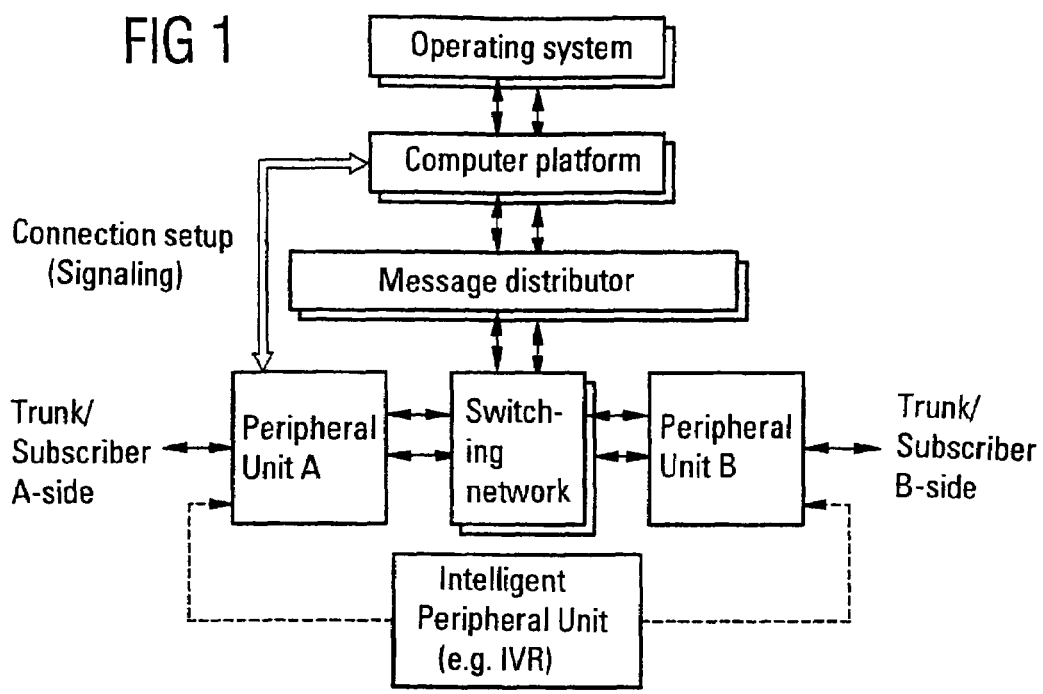
FIG. 1 shows the typical architecture of a classical switching center.
Figure 2:
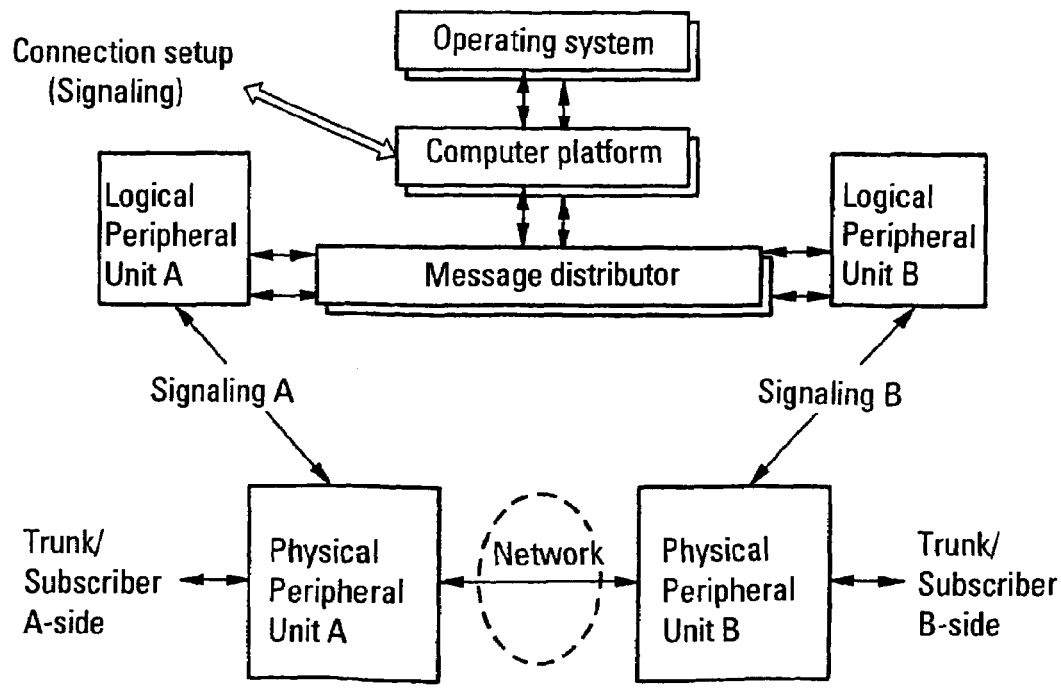
FIG. 2 shows the separate routing of voice and signaling.
Figure 3:
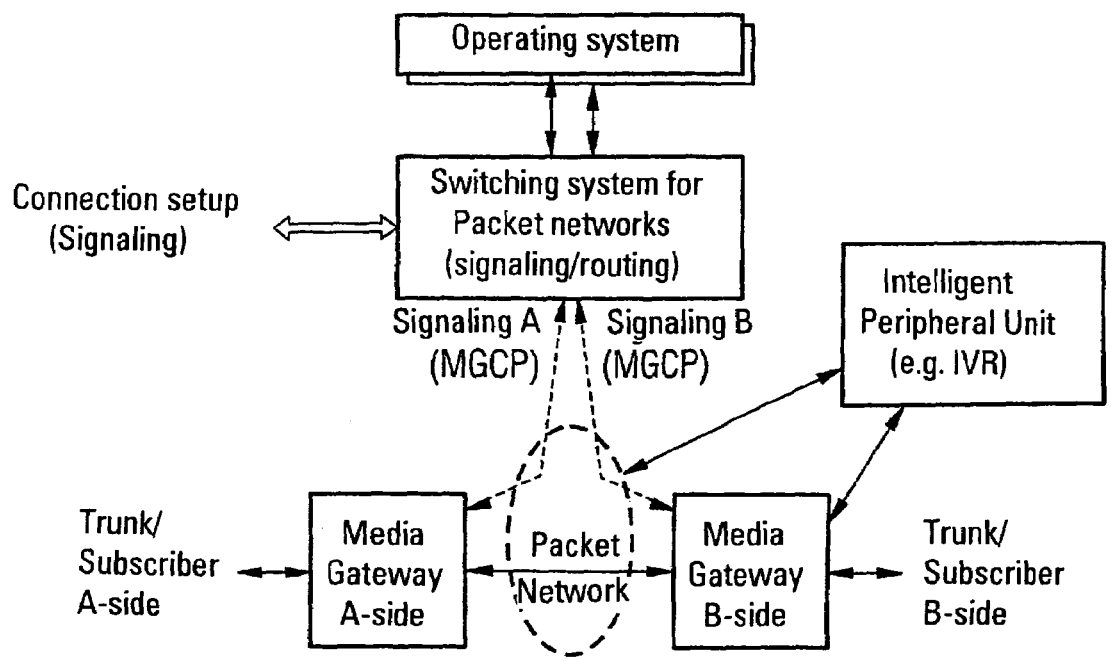
FIG. 3 is a schematic representation of transmitting voice over a packet-switched data transmission network.

Voice data can here be transmitted either over a second data transmission network 6, for example the public telephone network employing the TDM (Time Division Multiplex) or PCM (Pulse Code Modulation) method, or over a first data transmission network 5, for example a IP-based data transmission network, as data packets.

Subscriber 8 (PSTN subscriber 8), for example, is connected to a switching center in the public telephone network 6 (second data transmission network 6), while subscriber 7 (IP subscriber 7) telephones over an IP network 5 (first data transmission network 5) using Voiceover-IP.

According to the present invention, first voice channel-related functions, which are needed relatively seldom and/or require a high level of implementation effort, are provided centrally by a dialog device 3. This dialog device 3 can be, for example, an independent device or can be implemented in a switching center 9 in the packet network 5.

Furthermore, second voice channel-related functions, which are needed more frequently and/or require a lower level of implementation effort than the first voice channel-related functions, are provided non-centrally by a multiplicity of network interworking nodes 2a, 2b (media gateways 2a, 2b) by means of announcement devices 4a, 4b.

First voice channel-related functions, which are needed less frequently and generally require a high level of implementation effort, include complex dialogs with voice recognition, such as interrogating the credit amount on a pre-paid card, rail service information, and text-to-speech functionality etc. The implementation of such dialog functions is relatively complex owing to the need to implement voice recognition, a database and/or appropriate access etc. First voice channel-related functions can, however, additionally be standard announcements (such as "The number you have dialed is unobtainable"), DTMF (Discrete Tone Multi-Frequency) signal recognition, and tones etc.

Second voice channel-related functions, which are needed much for frequently and generally require much less implementation effort, include tones (dial tone, busy tone etc.), announcements ("The number you have dialed has changed." etc.), and simple dialogs such as interrogating a PIN (Personal Identification Number) number.

Figure 4:
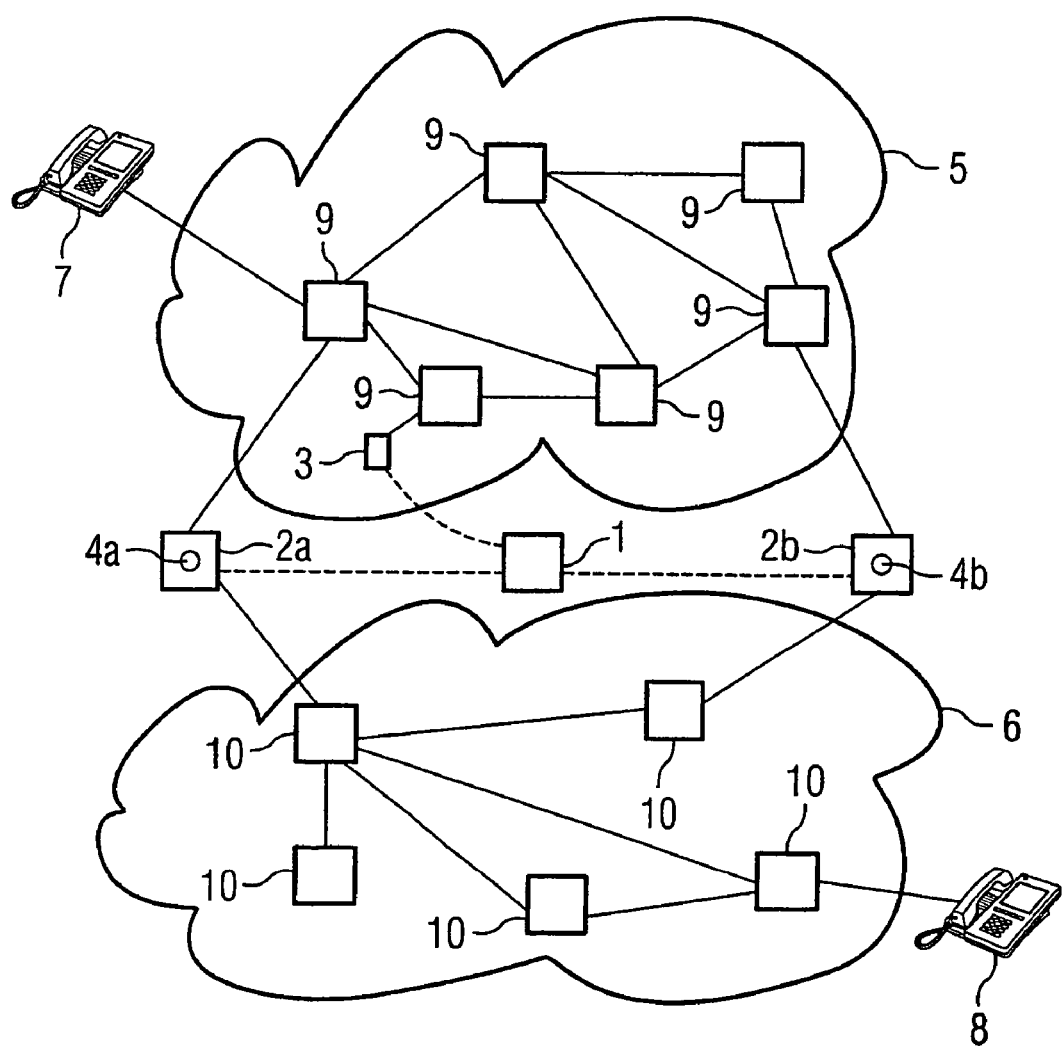
FIG. 4 is an example of the provisioning of voice channel-related functions according to the invention.

As can be seen from FIG. 4, subscribers are provided the respective second voice channel-related functions by the network interworking nodes 2a, 2b located in the relevant subscriber's vicinity; subscriber 7, for example, is provided the second voice channel-related functions by the network interworking node 2a and subscriber 8 is provided the second voice channel-related functions by the network interworking node 2b, while the first voice channel-related functions are made available to both subscribers by the dialog device 3.

The dialog device 3 and the announcement devices 4a, 4b are controlled by the central control 1. Said devices are controlled in terms of, for instance, the type of announcement, dialogs etc. to be played, and routing of the relevant voice channel-related functions etc.

The method according to the invention has the advantage that decentralizing of the second voice channel-related functions substantially reduces the data load in the transmission network as the transmission paths to the subscriber are shortened, whereby the possibility remains of implementing costly voice channel-related functions on a centralized basis in order to limit the costs of implementation. The packet network 5 is furthermore relieved as the second voice channel-related functions can be transmitted over the TDM network (public telephone network 6).

Figure 5:
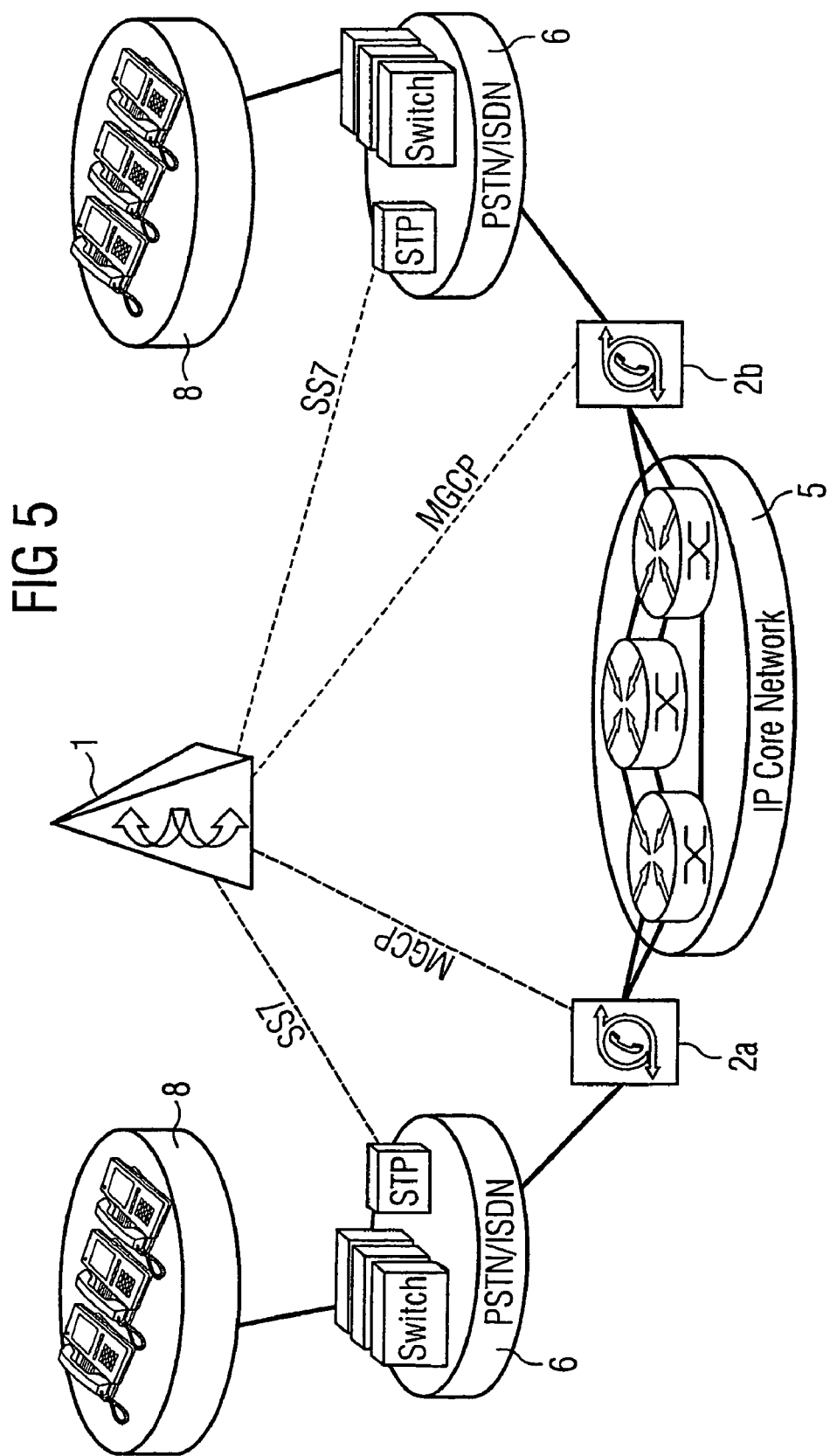
FIG. 5 is a further example of the application of the present invention in a telecommunications network.

FIG. 5 shows a further example of the present invention's application in a telecommunications network.

The central control 1 transmits signaling messages, for example to public telephone networks (second data transmission network 6) for example for the connection between an A-subscriber and a B-subscriber etc.

This central control 1 furthermore controls the network interworking nodes 2a, 2b which in this example are shown as media gateways. The media gateways form the interface between a packet network (first data transmission network 5, IP network, for example) and a public telephone network 6. The network interworking nodes 2a, 2b are furthermore able to inject the voice channel-related functions both into the first data transmission network 5 and into the second data transmission network 6.

Signaling takes place using various protocols, such as Signaling System No. 7 (SS7) or the media gateway control protocol (MGCP). With this Voice-over-IP network scenario shown, which is to say when voice data is transmitted over a packet network (first data transmission network 5), where the function blocks of a switching system are no longer implemented on a locally concentrated basis but, instead, are arranged in a geographically distributed manner, further factors now need to be considered during implementation of the IVR functionality. It must be possible for announcements and tones to be injected both in the direction of the packet network and in the direction of the TDM network and the load on the packet network due to announcements and tones must be minimized. The geographical distribution of the network interworking points (media gateways) makes the centralized design of an announcement and/or dialog system (Interactive Voice Response system, IVR system) appear very uneconomical because announcements and tones have to be transmitted over long distances, in extreme cases between continents.

A possible solution would be to provide the IVR functionality in each media gateway. An argument against this, however, is that some IVR functions are very implementation intensive and, for example for database inquiries, require complex interoperation with other components.

The present invention proposes splitting the IVR functions into two functional areas. The functions of the first area (first voice channel-related functions) are required far less frequently than those of the second area. They comprise, for example, interrogating the credit amount on a pre-paid card or recognizing voice, together with the associated actions.

A functional limitation permits a very substantial reduction in implementation effort. The functions of the second area (second voice channel-related functions) are required more frequently, in an extreme case during every call. They comprise the injection of tones, simple announcements that do not keep changing, such as interrogating a PIN number, and recognizing subscriber entries in the form of DTMF (Discrete Tone Multi-Frequency) signals.

There are a number of advantages if the functions of the second area are implemented non-centrally in the media gateway (network interworking node):

Tones and announcements which are transmitted over the telephone network produce no load in the packet network. The non-central arrangement increases the availability of the IVR functions in the network; the IVR function of any other media gateway can be used in the event of an outage. Being available on both sides of a connection, the IVR function can be used in a optimized manner. Tones and announcements to the A-subscriber or A-trunk are injected by the media gateway of the A-side; on the B-side analogously to this. The call-processing flows of the controlling system (switching system for packet networks) correspond to those of conventional TDM switching; the prerequisite for this is for the IVR function to be modeled in the form of "IVR ports".

If a multiplicity of IVR resources are provided in the preceding manner in the network on a distributed basis, then by employing a switching center's existing functionality of origin-dependent routing the advantage will be achieved of providing announcements and dialogs in such a manner that the load on the network will be minimized. It means that a connection which is routed over a media gateway and which requires an IVR function is preferably provisioned by IVR resources in this gateway or in the vicinity of this gateway.

The functions of the first area continue to be implemented by means of a centralized approach. Interworking with the packet network takes place either directly or through a media gateway. Low usage means that costs and network load become factors of secondary importance, whereas incorporating a server and database environment can be done more effectively using the centralized approach.

According to the present invention the IVR functionality is split into two areas taking account of the frequency of usage and complexity of the implementation. Furthermore, the frequently required IVR functions are implemented in the peripheral unit of a packet network, which is to say in the media gateways. The IVR functionality is implemented in the media gateway in a manner such that announcements and/or tones can be fed out both into the packet and into the TDM network (seen from the media gateway). Seldom required IVR functions are furthermore implemented by means of a centralized approach.

IP-based IVR systems available outside the first switching node are modeled as virtual announcement ports on a new type of media gateway. There are two versions of this new type of gateway: if it only makes IVR resources available it is a universally applicable IVR system offering only IVR functionality; if, alongside the IVR system, ports are also provided for the TDM <-> IP network interworking point, then it is a media gateway IVR system with reduced functionality providing simple IVR functions (such as standard announcements in the form of what are termed recorded announcements). The equipment is controlled in both cases by the central control 1 using MGCP.

If a tone, announcement or dialog function is employed in one of the above-described media gateways, an announcement/dialog port will be seized on the B-side. The port making announcement/dialog functions available is notified of the type of IVR function by means of further MGCP signaling.

To be able to transmit all the parameters which are known from the H.248 standard and which are also required for the internal IVR features of the switching center and network interworking nodes, an expansion of the MGCP protocol with parameters from H,248 is proposed which define the required functions such as 'Send tone xy' or 'Play announcement xy'.

To achieve connecting of tones/announcements taking place to a maximum extent within the media gateway, a connection is switched dependent on the origin, which is to say depending on the requesting port, to the nearest port which provides an announcement/dialog function and which is generally located in the same media gateway.

The invention claimed is:

1. A method for providing voice channel-related functions in a telecommunications network, comprising:
    providing a dialog device at a central location in the network to accommodate a plurality of first voice channel-related functions within the telecommunications network; and
    providing a plurality of announcement devices at distributed locations in the network to accommodate a plurality of second voice channel-related functions within the telecommunications network, the second voice channel-related function being used more frequently than the first voice channel-related functions.

2. A method according to claim 1, wherein the first and second voice channel-related functions are controlled at a central location in the network.

3. A method according to claim 1, wherein the first voice channel-related functions comprise complex dialog functions, simple dialog functions, tones, and/or announcements and the second voice channel-related functions only include tones, announcements, and/or simple dialog functions.

4. A method according to claim 1, wherein the first voice channel-related functions are transmitted over a first data transmission network and the second voice channel-related functions are transmitted over the first data transmission network and/or a second data transmission network.

5. A method according to claim 4, wherein a packet-switched data transmission network is employed as the first data transmission network and a circuit-switched data transmission network is employed as the second data transmission network.

6. A method according to claim 4, wherein the second data transmission network is a public telephone network and the first data transmission network is an IP-based data transmission network.

7. A method according to claim 4, wherein the second voice channel-related functions are provided by an announcement device located in each case in a network interworking node between the first and second data transmission network.

8. A telecommunications network for providing voice channel-related functions, comprising:
    a dialog device for providing a plurality of first voice channel-related functions at a central location in the network;
    a plurality of announcement devices for providing a plurality of voice channel-related functions at distributed locations within the network, the second voice channel-related functions being used more frequently than the first voice channel-related functions; and
    a central controller for controlling the first voice channel-related functions of the dialog device and the second voice channel-related functions of the announcement devices.

9. A telecommunications network according to claim 8, wherein the announcement devices provide the voice channel-related functions for both a circuit-switched data transmission network and a packet-switched data transmission network.

10. telecommunications network according to claim 9, wherein the announcement devices are implemented in a network interworking node between the first data transmission network and second data transmission network.

11. A telecommunications network according to claim 8, wherein the dialog device is implemented in a switching center for the second data transmission network or is controlled by said switching center as external equipment of the second data transmission network.

12. A telecommunications network according to claim 8, wherein the first voice channel-related functions comprise complex dialog functions, simple dialog functions, tones, and/or announcements and the second voice channel-related functions only include tones, announcements, and/or simple dialog functions.

13. A telecommunication according to claim 8, wherein the first voice channel-related functions are transmitted over a first data transmission network and the second voice channel-related functions are transmitted over the first voice channel-related functions and/or a second data transmission network.

14. A method according to claim 8, wherein the second data transmission network is a public telephone network and the first data transmission network is an IP-based data transmission network.

15. A method according to claim 8, wherein the second voice channel-related functions are provided by an announcement device located in a network interworking node between the first and second data transmission network.

16. A method according to claim 6, wherein the second voice channel-related functions are provided in each case by means of an announcement device located in each case in a network interworking node between the first and second data transmission network.

* * * * *